July 8, 1952  B. MARCELLUS  2,602,350
CONDITION RESPONSIVE INSTRUMENT
Filed Dec. 21, 1949

INVENTOR.
Brooks Marcellus
BY
ATTORNEYS

Patented July 8, 1952

2,602,350

UNITED STATES PATENT OFFICE 2,602,350

CONDITION RESPONSIVE INSTRUMENT

Brooks Marcellus, Rockford, Ill., assignor to Barber-Colman Company, Rockford, Ill., a corporation of Illinois Application December 21, 1949, Serial No. 134,224

4 Claims. (Cl. 74—519)

This invention relates to condition responsive instruments such as thermostats, pressurestats, and humidostats, and has more particular reference to those of the proportioning type for use in control systems in which a modifying or restraining force is transmitted from the controlled instrumentality back to the instrument to produce the proportioning action or so-called droop.

The primary object is to provide an instrument of the above character incorporating a novel and simple means for adjusting the amount of droop of the instrument.

A more detailed object is to provide such an instrument in which the condition responsive force is applied to an elongated flexible strip mounted cantilever fashion.

Figure 1:
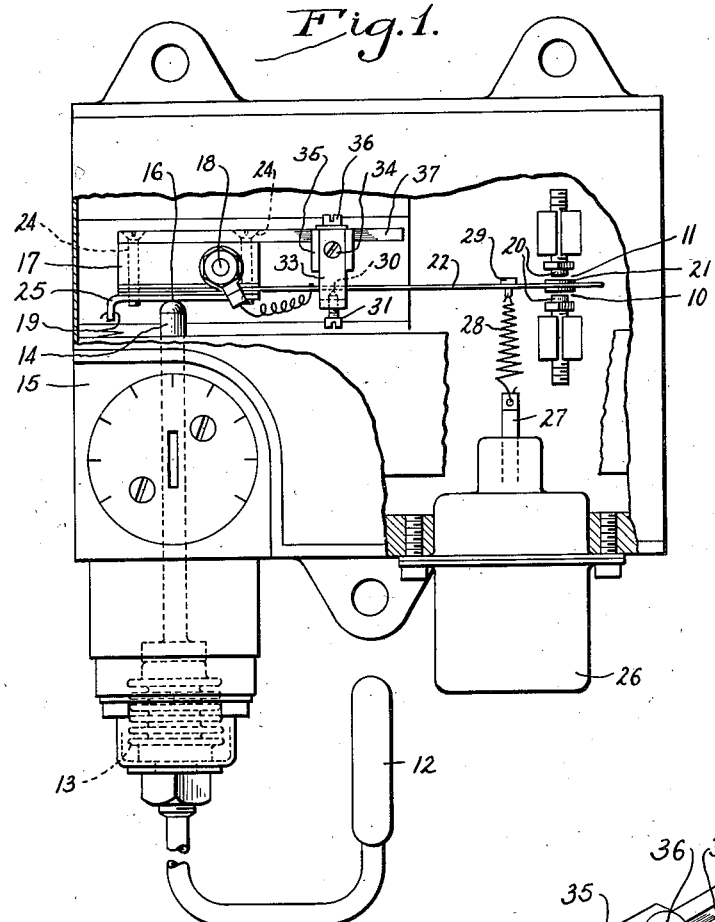

Other objects and advantages of the invention will become apparent from the following detailed description taken in connection with the accompanying drawings, in which Figure 1 is a fragmentary elevational view of a condition responsive instrument embodying the novel features of the present invention, a portion of the instrument casing being broken away to show the internal parts.

Figure 2:
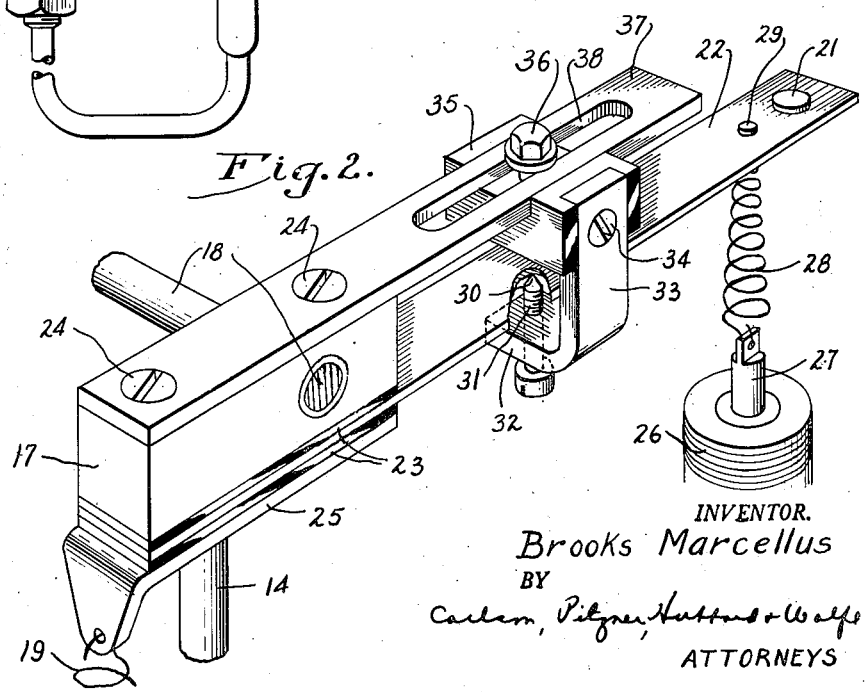

Fig. 2 is a fragmentary perspective view of the main operating parts.

In the drawings, the invention is shown for purposes of illustration incorporated in an instrument for actuating one or more control devices such as switches 10 and 11 in response to variations in a control force produced by changes in a condition such as temperature, pressure, or the like which is to be regulated automatically. Herein, changes in the condition such as the temperature of a fluid filled bulb 12 are reflected in pressure changes on a diaphragm 13 and therefore in the force exerted on an endwise movable rod 14 mounted on a casing 15 which supports the other movable parts of the instrument.

The rod bears at 16 against the side of a generally rectangular block 17 fulcrumed near one end on a pin 18 projecting forwardly from the back of the casing 15. A contractile spring 19 acting on the other end of the block tends to swing the latter counterclockwise so as to balance the upwardly directed force exerted on the block by the rod 14.

The switches 10 and 11 comprise opposed fixed contacts 20 cooperating with a movable contact 21 carried on the end of an elongated generally flat and relatively thin strip 22 of resilient material whose other end portion lies against the lower side of the block 17 between strips 23 of insulation and is clamped to the block by bolts 24 extending through a plate 25. To impart the desired droop or proportioning action to the instrument, a force derived from the motion of the valve or other regulating device controlled by the switches is transmitted back to the overhanging end of the cantilever strip 22 and utilized to vary a force which acts constantly to maintain the strip flexed to some extent. Herein, the droop-producing force is derived through the action of a solenoid 26 whose armature 27 is connected through a light contractile spring 28 to the strip 22 at a point 29 adjacent the switch contact 21.

To vary the droop of the instrument or in other words the range over which the condition controlled by the instrument may vary, provision is made for varying the mechanical advantage of the force change resulting from a given variation in the energization of the solenoid 26. In accordance with the present invention, this is accomplished by selective adjustment of the effective length of the cantilever strip 22. For this purpose, the point of anchorage of the cantilever is defined by a point 30 which is normally rigid with the block 17 but is adjustable selectively along the latter. Herein, the point bears upwardly against the underside of the strip and is formed by the end of a screw 31 threading upwardly through the short leg 32 of an L-shaped bracket 33 whose upstanding leg is secured by a screw 34 to a block 35 of insulation. Normally the block is clamped by a screw 36 to the overhanging end portion of a straight bar 37 which is slotted longitudinally at 38 to receive the screw 36 and is secured rigidly by the bolts 24 against the top of the block 17. The walls of the slot 38 define a guideway which parallels the strip 22 and, after loosening of the screw 36, permits the block 35 and the screw 31 to be shifted along the cantilever 22 thus varying the position of the anchor point 30. The length of the overhanging part of the strip 22 may thus be adjusted as desired.

For any given position of the anchorage point 30, the free end portion of the spring arm 22 will bend under the force of the spring 28 and exert a predetermined force in opposition to the spring force. Therefore, for a given temperature of the bulb 12 and a given angular position of the block 17 about its fulcrum 18, a predetermined pull by the spring 28 will be required in order to bend the spring arm 22 and close the switch 10. If the cantilever arm is stiffened by reducing its effective length, a greater pull by the spring 28 is required to effect closure of the same switch. Conversely, weakening of the cantilever by shifting the anchor point 30 toward the block 17 will result in closure of the switch 10 under a spring force of lesser magnitude. As a result, the effective droop or proportioning range of the instrument may be varied as desired simply by adjusting the point 30 of anchorage of the cantilever arm 22.

I claim as my invention:

1. A condition responsive instrument having, in combination, a block fulcrumed to swing about a transverse axis and carrying a guideway along one side, condition responsive means for swinging said block about said axis, an elongated strip of resiliently flexible material secured rigidly at one end to said block and projecting from the block parallel to said guideway, a member slidable in said guideway and projecting across the free end portion of said strip, a screw rigid with said member and bearing at its end against one side of said strip intermediate the ends of the latter whereby to define a point of anchorage about which the free end portion of said strip may flex, means for securing said member rigidly in said guideway in different positions of adjustment along the latter, means exerting a laterally directed variable force on the free end portion of said strip to hold the latter flexed, and a control device responsive to the movements of said free end.

2. A condition responsive instrument having, in combination, a block fulcrumed to swing about a transverse axis and having a guideway along one side, condition responsive means for swinging said arm about said axis, an elongated strip of resiliently flexible material secured rigidly at one end to said block and projecting from the block parallel to said guideway, a member slidable in said guideway, means rigid with said member and bearing against said strip intermediate the ends of the latter whereby to define a point of anchorage about which the free end portion of said strip may flex, means for securing said member rigidly to said block in different positions of adjustment along said guideway, and a control device responsive to the movements of the free end of said strip.

3. A condition responsive instrument having, in combination, a member fulcrumed to swing about a transverse axis, an elongated strip of resiliently flexible material secured rigidly at one end to said member and projecting therefrom cantilever fashion, a part normally secured rigidly to said member but selectively adjustable relative to the latter along said strip, means on said part slidably engaging said strip to define a point of anchorage about which the free end portion of said strip may flex cantilever fashion, and a control device responsive to the movements of the free end of said strip.

4. A condition responsive instrument having, in combination, an elongated laterally flexible spring arm, a member supporting said arm cantilever fashion and providing a point of anchorage for the arm which is adjustable along the arm to vary the effective length of the free end portion of the arm, a control device actuated in response to changes in the position of the free end of said arm, a stationary body movably supporting said member for shifting in a direction generally laterally of said arm, condition responsive means having an element movable back and forth with opposite condition changes, and a connection between said member and said element to shift said member and said arm bodily therewith in response to condition changes.

BROOKS MARCELLUS.

REFERENCES CITED

The following references are of record in the file of this patent:

UNITED STATES PATENTS

| Number | Name | Date |
| --- | --- | --- |
| 1,479,580 | Barnum et al. | Jan. 1, 1924 |
| 1,661,349 | Sawyer | Mar. 6, 1928 |
| 1,827,102 | Penn | Oct. 13, 1931 |
| 1,876,822 | Mansure | Sept. 13, 1932 |
| 2,107,809 | Warner | Feb. 8, 1938 |
| 2,487,213 | Bender | Nov. 8, 1949 |

FOREIGN PATENTS

| Number | Country | Date |
| --- | --- | --- |
| 195,424 | Great Britain | Mar. 26, 1923 |